United States Patent
Chauhan

(10) Patent No.: US 11,240,339 B2
(45) Date of Patent: Feb. 1, 2022

(54) MANAGING MULTIMEDIA CONTENT AT EDGE SERVERS

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/872,914

(22) Filed: May 12, 2020

(65) Prior Publication Data

US 2021/0360081 A1 Nov. 18, 2021

(51) Int. Cl.
*H04L 29/08* (2006.01)
*H04L 29/06* (2006.01)
(Continued)

(52) U.S. Cl.
CPC ...... *H04L 67/2842* (2013.01); *H04L 29/0881* (2013.01); *H04L 29/08936* (2013.01);
(Continued)

(58) Field of Classification Search
CPC .......... H04L 29/06448–06462; H04L 29/08801–08819; H04L 29/08963; H04L 29/08918–08936; H04L 65/4069–4084; H04L 67/2842–2852; H04L 67/32; H04L 67/30–306; H04N 21/231–23103; H04N 21/44204; H04N 21/44213; H04N 21/4524–4532
See application file for complete search history.

(56) References Cited

U.S. PATENT DOCUMENTS

| 9,391,908 B1 * | 7/2016 | Barsness | H04L 67/101 |
| 2011/0055413 A1 * | 3/2011 | Lobsenz | G06Q 10/06 709/231 |

(Continued)

OTHER PUBLICATIONS

D. Marinca, A. Hamieh, D. Barth, K. Khawam, D. De Vleeschauwer and Y. Lelouedec, "Cache management using temporal pattern based solicitation for content delivery," 2012 19th International Conference on Telecommunications (ICT), Jounieh, 2012, pp. 1-6.*

(Continued)

*Primary Examiner* — Brendan Y Higa
(74) *Attorney, Agent, or Firm* — Han Santos, PLLC

(57) ABSTRACT

A content management system to optimize delivery of multimedia content to user devices in a subscriber network is provided. The system generates a set of telemetry data by monitoring selections of multimedia content instances by subscribers of a subscriber network at a set of edge servers of the subscriber network. The system generates a data consumption model based on the set of telemetry data. The system anticipates a set of multimedia content instances for a current time interval by using the generated data consumption model to identify the anticipated set of media content instances for the current time interval. The system caches the anticipated set of multimedia content instances from one or more network sources. The system provides the cached content instances to one or more subscribers in response to multimedia content selections from the subscribers for the current time interval.

20 Claims, 6 Drawing Sheets

(51) Int. Cl.
    *H04L 12/26*     (2006.01)
    *H04L 12/801*     (2013.01)
    *H04N 21/442*     (2011.01)
    *H04N 21/45*     (2011.01)
    *H04N 21/231*     (2011.01)

(52) U.S. Cl.
    CPC ............ *H04L 43/04* (2013.01); *H04L 47/127* (2013.01); *H04L 65/4076* (2013.01); *H04L 65/80* (2013.01); *H04L 67/22* (2013.01); *H04L 67/2847* (2013.01); *H04L 67/306* (2013.01); *H04N 21/23106* (2013.01); *H04N 21/44204* (2013.01); *H04N 21/4532* (2013.01)

(56) References Cited

U.S. PATENT DOCUMENTS

| | | | | |
|---|---|---|---|---|
| 2011/0302068 | A1* | 12/2011 | Garrett | G06Q 30/0215 |
| | | | | 705/34 |
| 2012/0257560 | A1* | 10/2012 | Srinivasan | H04L 67/2842 |
| | | | | 370/312 |
| 2013/0145001 | A1* | 6/2013 | Qian | H04L 67/2842 |
| | | | | 709/223 |
| 2014/0012970 | A1* | 1/2014 | Parry | H04W 4/50 |
| | | | | 709/224 |
| 2014/0059156 | A1* | 2/2014 | Freeman, II | H04L 63/061 |
| | | | | 709/213 |
| 2014/0082192 | A1* | 3/2014 | Wei | H04L 65/4084 |
| | | | | 709/224 |
| 2015/0180924 | A1* | 6/2015 | O'Callaghan | H04L 43/0829 |
| | | | | 709/219 |
| 2015/0319214 | A1* | 11/2015 | Yu | H04L 67/2847 |
| | | | | 709/219 |
| 2017/0171083 | A1* | 6/2017 | Barsness | H04L 65/4069 |
| 2018/0241836 | A1* | 8/2018 | Arsenault | H04L 65/4084 |
| 2019/0058750 | A1* | 2/2019 | Bouvigne | H04N 19/147 |
| 2019/0245917 | A1* | 8/2019 | Mendiola | H04L 67/2842 |
| 2019/0306265 | A1* | 10/2019 | Hakansson | H04L 67/18 |
| 2019/0320229 | A1* | 10/2019 | Shaw | H04N 21/44209 |
| 2020/0252471 | A1* | 8/2020 | Chauhan | H04N 21/4532 |
| 2020/0259878 | A1* | 8/2020 | Yang | H04L 65/1016 |

OTHER PUBLICATIONS

M. Claeys, N. Bouten, D. De Vleeschauwer, W. Van Leekwijck, S. Latré and F. De Turck, "Cooperative Announcement-Based Caching for Video-on-Demand Streaming," in IEEE Transactions on Network and Service Management, vol. 13, No. 2, pp. 308-321, Jun. 2016.*

D. Oreščanin, T. Hlupic and I. Sorić, "Predictive models for digital broadcasting recommendation engine," 2018 41st International Convention on Information and Communication Technology, Electronics and Microelectronics (MIPRO), Opatija, 2018, pp. 1243-1248.*

B. Carbunar, M. Pearce, V. Vasudevan and M. Needham, "Predictive Caching for Video on Demand CDNs," 2011 IEEE Global Telecommunications Conference—GLOBECOM 2011, Houston, TX, USA, 2011, pp. 1-5.*

Elbert, Dan et al. "Predictive caching of video content in 5G networks based on motion and content consumption analysis". Sep. 18, 2017. Cisco Systems, Inc.*

* cited by examiner

MANAGING MULTIMEDIA CONTENT AT EDGE SERVERS

BACKGROUND

A content delivery network (CDN) refers to a distributed group of servers which work together to provide fast delivery of Internet content. A CDN allows for the quick transfer of assets needed for loading Internet content including HyperText Markup Language (HTML) pages, JavaScript files, stylesheets, images, and videos. A strategically placed edge server in a CDN provides users with cached versions of static content from origin servers. Edge servers provide content such as images, JavaScript, HTML, and downloadable content. Edge servers help reduce the workload on origin servers and reduce latency for users. These servers are deployed at points of presence and edge locations across a CDN.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Edge servers typically fetch new content from a content repository and cast the content to a subscriber device based on their selection. However, edge server resources are finite and at times of network congestion, the number of viewing requests may cause some subscribers to experience high latency and longer buffering times in viewing their content. This disclosure is directed to systems and techniques for casting multimedia content to subscribers of a subscriber network. A content management system is implemented at a set of edge servers of a subscriber network to improve delivery of multimedia content to user devices in the subscriber network. The system infers the network congestion of the set of edge servers at a future point-in-time based on, at least in part, a data consumption model and preemptively fetches the instances of multimedia content from a content repository at a point in time prior to the future point-in-time.

Figure 1:
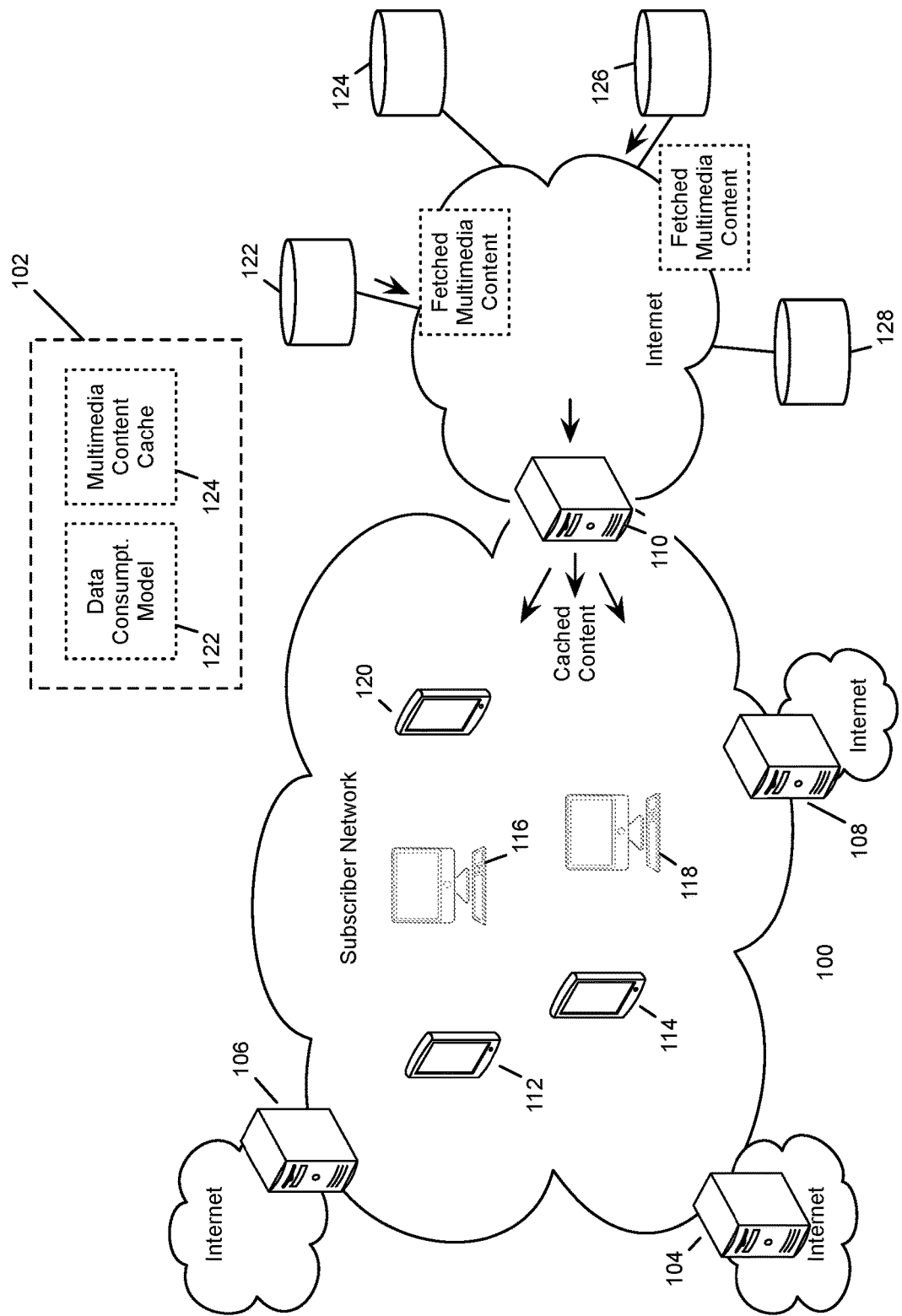
FIG. 1 conceptually illustrates a subscriber network having edge servers that cast multimedia content to subscribers.

FIG. 1 conceptually illustrates a subscriber network 100 having edge servers that cast multimedia content to subscribers. The edge servers implement a content management system 102. The content management system 102 monitors telemetry data of the subscriber network 100. The system 102 fetches multimedia content from the Internet to cache on a set of edge servers 104-110 based on a model that is generated from the monitored telemetry data. The edge servers 104-110 recast the cached multimedia content to user devices 112-120 of the subscriber network.

The subscriber network 100 includes network infrastructure (network and computing resources) that delivers multimedia content and other types of data to user devices belonging to subscribers of the network. In other words, the subscriber network 100 may be a content delivery network (CDN). As illustrated, the subscriber network 100 is supported by a set of edge servers 104-110, which controls data flow in and out of the subscriber network 100. In some embodiments, the set of edge servers 104-110 may be used to support a portion of the subscriber network 100 that is dedicated to a particular geographic location, and the set of edge servers 104-110 controls the data flow with other portions of the subscriber network 100, or other external networks such as the Internet. Through the set of edge servers, the user devices 112-120 may receive content from servers 122-128.

User devices 112-120 are connected to subscriber network 100 and have access to network and computation resources of the subscriber network. Each of the user device 112-120 may be a desktop computer, a laptop computer, tablet computer, a smartphone, a smartwatch, a personal digital assistant (PDA), or any other computing device or mobile device that is capable of communicating with other devices via a network. The user devices 112-120 can receive and transmit data by using the subscriber network 100, including multimedia content and other types data. At least some of the multimedia content received by user devices 112-120 are from sources external to the subscriber network 100, e.g., servers 122-128 that are accessible through the Internet. The edge servers 104-110 control and manage the flow of multimedia content from outside of the subscriber network 100 to user devices in the subscriber network 100.

In some embodiments, the network infrastructure of the subscriber network 100 includes the core network of a telecommunications service provider. The network infrastructure may include routers, switches, or other types of data forwarding elements for conducting data traffic (e.g., packet traffic) between various network endpoints such as user devices, base stations, hotspots, and other types of computing resources. The core network also provides access to external networks such as the Internet. The core network may include components that provide services to the subscribers of the cellular network and track positions of the user devices. The core network may include a packet network, e.g., an Evolved Packet Core (EPC) that interconnects different components belonging to an Evolved Packet System (EPS). EPC is a framework for providing converged voice and data on a 4G Long-Term Evolution (LTE) network. EPC unifies voice and data on an Internet Protocol (IP) service architecture. The EPC allows the operator of the subscriber network 100 to deploy and operate one packet network for 2G, 3G, 4G, 5G, wireless local area network (WLAN), and fixed access such as Ethernet, DSL, cable, and fiber.

The edge servers 104-110 are computing devices that control and process data flow at the edge of the subscriber network 100 with other networks. In some embodiments, each of the edge server computing devices 104, 106, 108 and 110 may be a general-purpose computer, such as a desktop computer, tablet computer, laptop computer, server, or an electronic device that is capable of receiving input, processing the inputs, and generating output data. The computing devices may also be virtual computing devices such as virtual machines or software containers that are hosted in a cloud computing environment in which computer system resources are made available without direct active management by user. Alternatively, the computing devices may be substituted with multiple computing devices, virtual machines, software containers, and/or so forth.

The set of edge servers 104-110 implement the content management system 102 for the subscriber network 100 for optimizing the casting or delivery of multimedia content to user devices of the subscriber network 100. The content management system 102 may be configured to monitor multimedia content selections of the subscriber network 100 (or within a geographic area that is supported or defined by the set of edge servers). The content management system 102 generates a data consumption model 122 for modeling the data consumption behavior of the users or subscribers of the subscriber network 100, specifically regarding the selection of multimedia content. The data consumption model 122 is used to determine (predict, identify, or anticipate) a set of multimedia content instances for a current time interval. The system caches the anticipated set of content instances from one or more network sources (e.g., source servers 122-128) and provides the cached content instances to one or more subscribers in response to multimedia content selections for the current time interval.

Figure 2A:
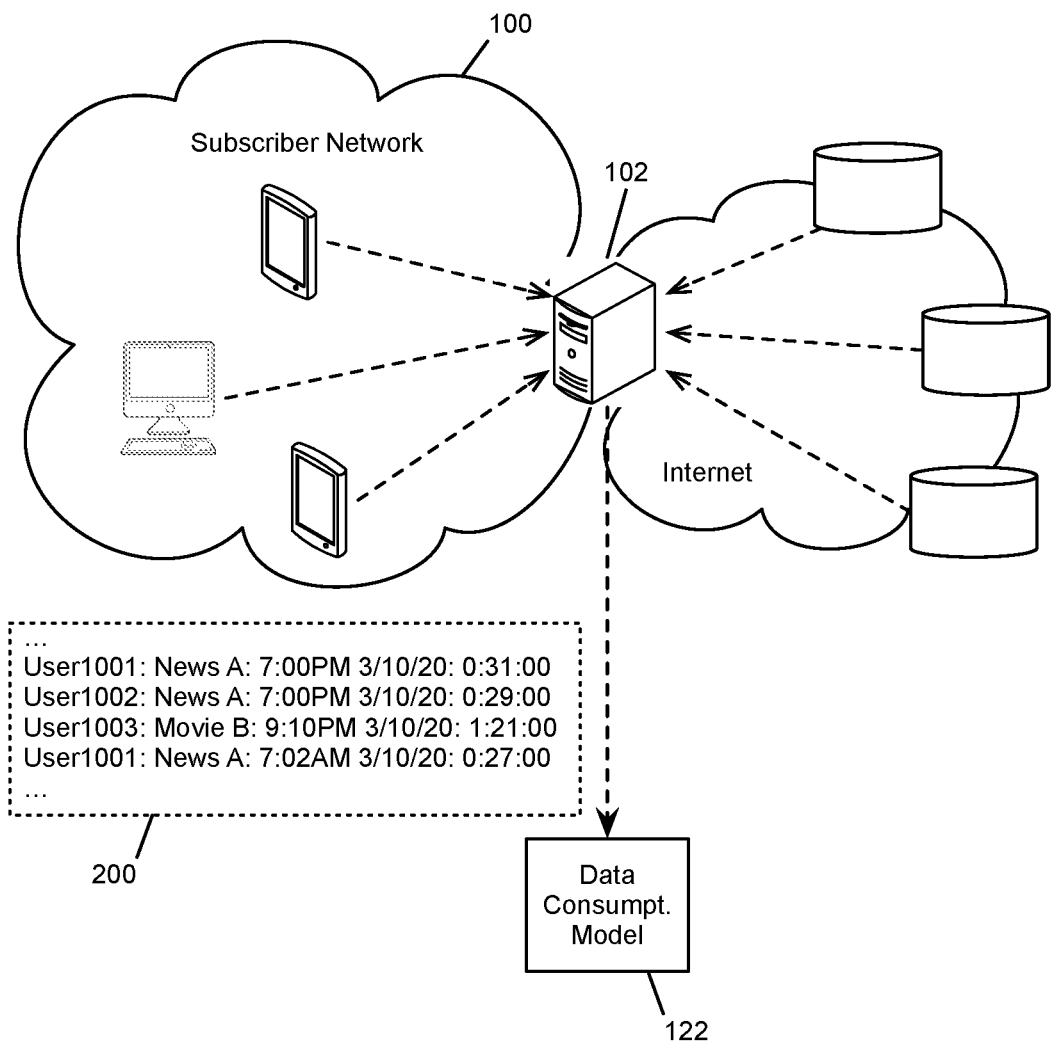
FIG. 2A illustrates the edge server monitoring media content selection from the user devices of the subscriber network.
Figure 2B:
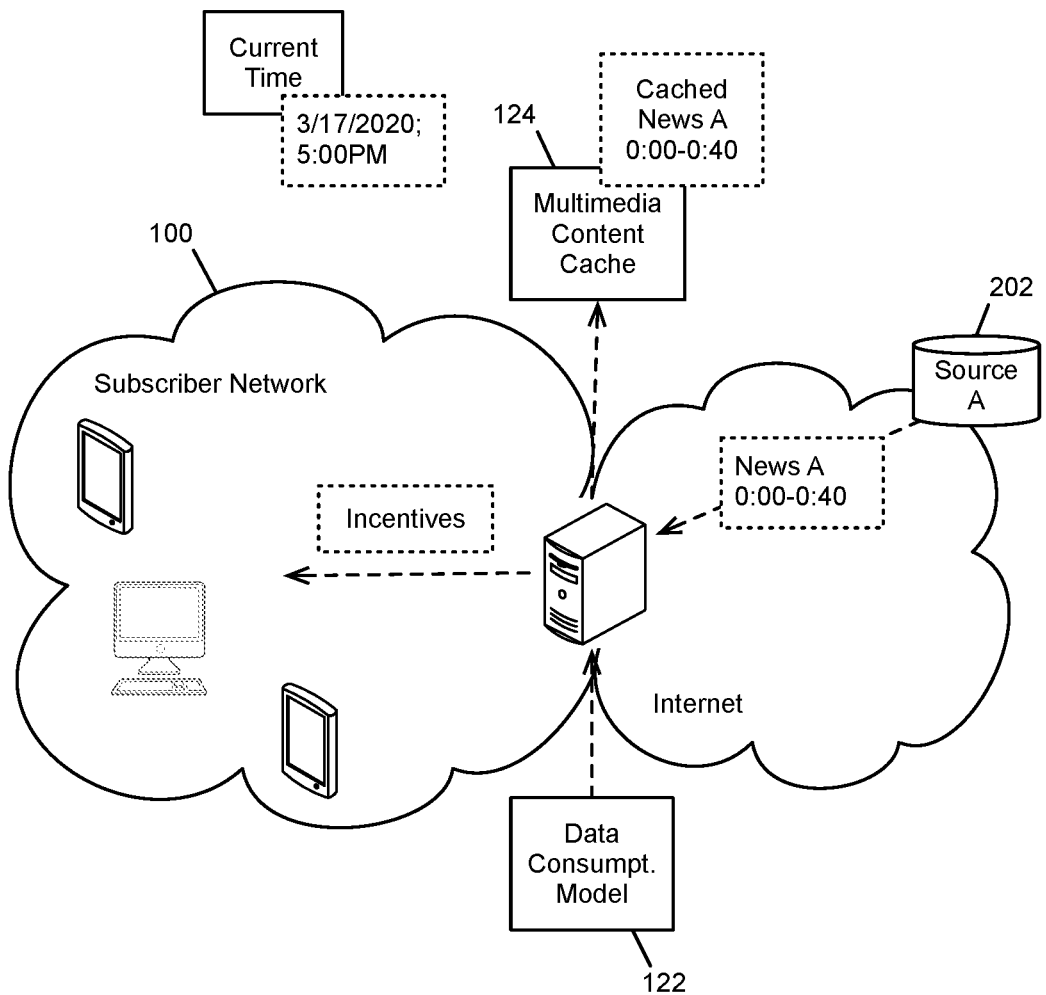
FIG. 2B illustrates the edge server preemptively fetching media content from sources external to the subscriber network and storing the fetched media content in the media content cache.
Figure 2C:
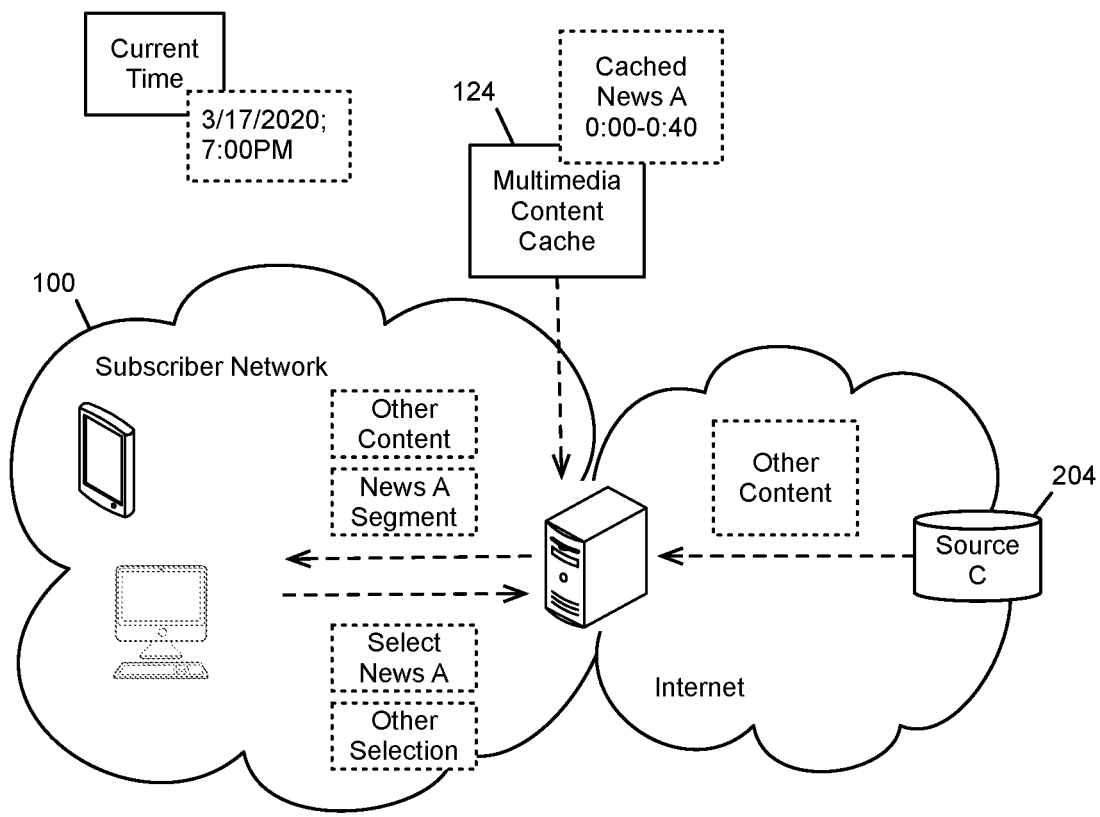
FIG. 2C illustrates recasting the cached media content from the multimedia content cache to user devices of the subscriber network.

FIGS. 2A-C conceptually illustrates the operations of the content management system 102 in the subscriber network 100. Specifically, the figure illustrates the operations of the edge server 110, which is one of the edge servers that implement the content management system 102.

FIG. 2A illustrates the edge server 110 monitoring media content selection from the user devices of the subscriber network 100. The monitoring of the media content selection generates a set of telemetry data 200, which is in turn used to train the data consumption model 122. The telemetry data used to train the data consumption model 122 may include the time of day and day of the week for which the particular multimedia content is selected, selected quality parameters (i.e. pixel density—480p, 1080p, etc.), and how much of the multimedia content is viewed following selection.

FIG. 2B illustrates the edge server 110 preemptively fetching media content from sources external to the subscriber network 100 and storing the fetched media content in the multimedia content cache 124. FIG. 2C illustrates recasting the cached media content from the multimedia content cache 124 to user devices of the subscriber network 100.

The content management system 102 may generate instructions to fetch sets of multimedia content to store in the multimedia content cache 124 in anticipation of receiving subscriber viewing requests. For example, if the content management system 102 infers that a particular episode in a TV series is likely to be selected by multiple subscribers within a predetermined time interval, the content management system may fetch and cache a copy of the particular episode in the multimedia content cache 124 at the set of edge servers. In this way, the copy of the episode may be recast to subscribers in response to their viewing selection. The system may avoid fetching multiple copies of the same multimedia content in response to multiple viewing selections. Instead, the selected multimedia content is preemptively cached (i.e. at a time of low network activity) in anticipation of viewing selections.

In the example illustrated in FIGS. 2A-C, the telemetry data 200 indicates that the media content "news A" is selected by multiple subscribers at 7:00 PM at date Mar. 10, 2020, which is a Friday. The data consumption model 122 is correspondingly trained such that the system anticipates that "news A" will be selected at 7:00 PM the following Friday Mar. 17, 2020 by multiple subscribers. Based on the data consumption model 122, the content management system 102 preemptively fetches "news A" from external source 202 "source A" to store in the multimedia content cache 124. The data consumption model 122 also indicates that there is less traffic through the edge server 110 at 5:00 PM, the content management system 102 therefore schedules the edge server 110 to download "news A" at 5:00 PM. At 7:00 PM, the edge server 110 recasts the media content "news A" to users who select "news A" for viewing.

Some users of the subscriber network 100 may select other multimedia contents at 7:00 PM. These other multimedia contents are not cached in the multimedia content cache 124 and have to be downloaded from sources or content repositories (e.g., "source C" 204) in external network. However, since multimedia content "news A" is prefetched and cached at 5:00 PM, the traffic congestion at the edge server 110 is reduced at 7:00 PM.

In some embodiments, the content management system may determine how much of the multimedia content is viewed by subscribers, and how much is left unviewed. For example, if only a first portion or segment of a multimedia content is usually viewed (e.g., the first 30 minutes of a 120-minute movie), the content management system may preemptively detect the viewing habit, and generate a particular segment of the multimedia content that corresponds to the typically viewed portion of the multimedia content plus an additional margin or tolerance (e.g., a 40-minute segment if the typical viewing segment is 30 minutes-10-minute margin). In this way, the particular segment of multimedia content may be cached on the edge server, instead of the entire portion (e.g., all 120 minutes of a 120-minute movie), thus freeing space to cache other multimedia content on the edge servers. In the example of FIGS. 2A-C, according to the telemetry data 200, the multimedia content "news A" is viewed for only about 30 minutes by the subscribers. The data consumption model 122 correspondingly is trained to only fetch and store 40 minutes of "news A" in the multimedia content cache 124 for later recast. In some embodiments, in the event that a subscriber's viewing exceeds the typically viewed segment (e.g., 30 minutes in the above example) and encroaches into the additional margin (e.g., 10 minutes in the above example), the content management system fetches the full length of the multimedia content from the corresponding content repository.

In some embodiments, the content management system monitors quality parameters of viewing selections and incentivizes consumers to select an instance of multimedia content (e.g., a 1080p version of a movie in lieu of 720p version) based on a predominant preference of subscribers that are supported by the set of edge servers. In this way, the content management system 102 may leverage the use of a cached instance of the multimedia content on its edge server, rather than fetching a different instance of the same content from a content repository because of different quality parameters.

In some embodiments, the content management system may also provide recommendations that relate to content that is less prominently viewed. For example, if a movie is rarely viewed by subscribers, the content management system may provide incentives for subscribers to refrain from streaming the movie during anticipated times of network congestion. Incentives may also include a reduced price for viewing or upgraded viewing quality. Doing so reduces the likelihood that the content management system is required to fetch and cache the movie on an edge server at a time when edge server resources are overwhelmed by other viewing selections.

In some embodiments, the content management system may use network triggers to selectively cache multimedia content. These network triggers may include inferred times of network congestion, and inferred interest in particular multimedia content. For example, the inferred time of network congestion may be used by the content management system to identify time intervals that are less likely to have network congestion such that the system may use these time intervals to download and cache multimedia content. The inferred interest in particular multimedia content may be used by the system to prioritize download and caching of certain multimedia content over others.

In some embodiments, the content management system may interface directly with a content programming server to receive a set of recommendations. The recommendations may be used to generate incentives to change subscriber viewing habits. When network congestion is likely, the content management system may generate incentives according to the recommendations received from the content programming server, which may recommend content based on business considerations or subscriber preferences. When network congestion is not likely, the content management system may generate incentives that motivate subscriber behavior to reduce network congestion, such as incentives to motivate subscribers to select multimedia content that are already (or scheduled to be) cached at the edge servers, or to select multimedia content instances of lesser quality. The content management system may present the incentives to the subscribers via a subscriber GUI.

In some embodiments, the edge server receives information regarding individual user devices when determining the incentives and recommendations, as well as when deciding which content to fetch and cache. Specifically, subscriber mobile devices may upload their wireless carrier reception status (e.g., the wireless technology being used, frequency ranges available, signal strengths available, bandwidth, etc.) or other static or dynamic user device information to the edge servers. The edge server may use the user device information for deciding whether to recommend the cached content, or whether to recommend a higher or lower quality multimedia instance, or whether to fetch and store a particular type of multimedia content. For example, the edge server may pre-emptively fetch and cache lower quality, shorter segments of certain very popular multi-media content if the edge server is aware that many of the user devices being used at that interval of time have poor wireless carrier coverage. The user device information may also be used as part of the data points for training the data consumption model.

Example Edge Server

Figure 3:
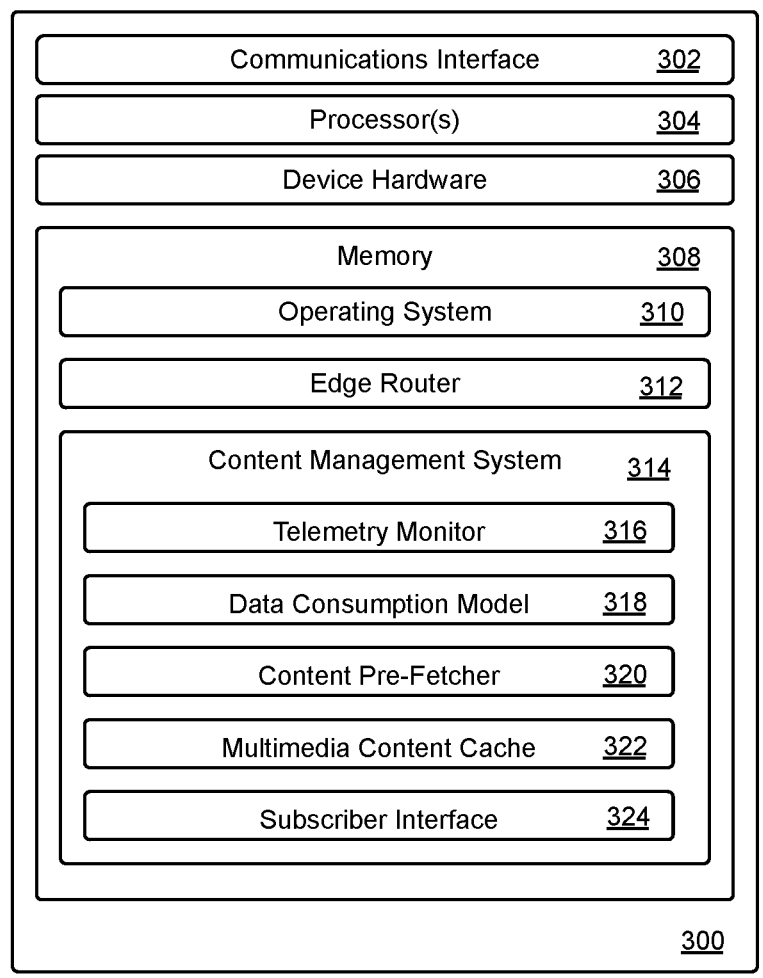
FIG. 3 is a block diagram showing various components of an edge server implementing the content management system, consistent with an embodiment of the disclosure.

FIG. 3 is a block diagram showing various components of an edge server (e.g., the edge server 110) implementing the content management system, consistent with an embodiment of the disclosure. The figure illustrates a computing device 300 implementing the edge server. The edge server computing device 300 may be a general-purpose computer, such as a desktop computer, tablet computer, laptop computer, server, or an electronic device that is capable of receiving input, processing the inputs, and generating output data. The computing device 300 may also be a virtual computing device such as a virtual machine or a software container that is hosted in a cloud. Alternatively, the computing device 300 may be substituted with multiple computing devices, virtual machines, software containers, and/or so forth.

The computing device 300 may be equipped with one or more of the following: a communications interface 302, one or more processors 304, device hardware 306, and memory 308. The communications interface 302 may include wireless and/or wired communication components that enable the computing devices to transmit data to and receive data from other devices. The data may be relayed through a dedicated wired connection or via a communications network. The device hardware 306 may include additional hardware that performs user interface, data display, data communication, data storage, and/or other server functions.

The memory 308 may be implemented using computer-readable media, such as a computer-readable storage medium. Computer-readable storage media include, at least, two types of computer-readable media, namely computer-readable storage media and communications media. Computer-readable storage media may include volatile and non-volatile, removable and non-removable media implemented in any method or technology for storage of information such as computer-readable instructions, data structures, program modules, or other data. Computer storage media may include, but is not limited to, random-access memory (RAM), read-only memory (ROM), electrically erasable programmable ROM (EEPROM) flash memory or other memory technology, compact-disc-ROM (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanisms.

The processors 304 and the memory 308 of the computing device 300 may implement an operating system 310, an edge router 312, and a content management system 314. The content management system 314 includes a telemetry monitor 316, a data consumption model 318, a content pre-fetcher 320, a multimedia content cache 322, and a subscriber interface 324.

The various software may include routines, program instructions, objects, and/or data structures that are executed by the processors 304 to perform particular tasks or implement particular abstract data types.

The operating system 310 may include components that enable the computing devices 300 to receive and transmit data via various interfaces (e.g., user controls, communications interface, and/or memory input/output devices), as well as process data using the processors 304 to generate output. The operating system 310 may include a presentation component that presents the output (e.g., display the data on an electronic display, store the data in memory, transmit the data to another electronic device, etc.). The operating system 310 may include a hypervisor that allows the computing device to operate one or more virtual machines and/or virtual network components. Additionally, the operating system 310 may include other components that perform various additional functions generally associated with an operating system.

The edge router 312 is a program that enables the computing device to perform functions of an edge server. These edge router 312 controls the receiving or fetching data from external sources and routing the received external data to network endpoints in the subscriber network. The edge router 312 also controls the receiving of data from data endpoints or user devices of the subscriber network and routing those data to endpoints external to the subscriber network. The edge router 312 may throttle or buffer data flow between endpoints of the subscriber network and the external network. The edge router 312 may also perform security operations such as encrypting/decrypting data packets passing through the computing device 300, and checking and blocking certain data packets from coming into the subscriber network.

The content management system 314 is a program that manages the delivery of multimedia content to the user devices of the subscriber network. The content management system 314 leverages the operations of the edge router 312 to communicate with external sources or repositories of multimedia content and to respond to selections of multimedia content by user devices of the subscriber network. In some embodiments, the content management system running on the computing device 300 is an instance of a content management system program that operates in a distributed manner across multiple computing devices that serves as edge servers of sub scriber network.

The telemetry monitor 316 is a module of the content management system 314 that is responsible for collecting telemetry or instrumentation data by monitoring selection of multimedia content by subscribers at a set of edge servers. The telemetry data being captured may include indications for the time of day and/or the day of the week that a particular multimedia content is selected, the quality parameters of the instance of the selected multimedia content, and how much of the multimedia content is actually viewed following selection.

The data consumption model 318 is a module of the content management system 314 that is responsible for maintaining a model that can be used to anticipate or predict the subscriber's selection behavior or viewing behavior with regard to multimedia content. In some embodiments, the data consumption model 318 is a machine learning model or data classifier based on an artificial intelligence construct such as a neural network. In some embodiments, the content management system 314 uses the output of the telemetry monitor 316 as training data for training the data consumption model 318. In some embodiments, the data consumption model 318 produces output that predicts or anticipates what and when to pre-fetch in order to minimize network congestion. In some embodiments, the data consumption model 318 uses a current time and a current network congestion level as input to produce the output.

The content pre-fetcher 320 is a module of the content management system 314 that is responsible for anticipating a set of multimedia content instances for a current time interval by using the data consumption model 318. The content pre-fetcher 320 generates instructions to fetch multimedia content instances based on the output of the data consumption model 318. The instructions may specify a particular time to fetch the multimedia content instance, a quality level for the multimedia content instance, and/or a particular segment of the multimedia content instance. The fetched multimedia instances are stored in the multimedia content cache 322.

The subscriber interface 324 is a module of the content management system 314 that is responsible for providing the cached content instances to one or more subscribers in response to multimedia content selections from the one or more subscribers for the current time interval. In some embodiments, the subscriber interface 324 may provide recommendations or incentives that relate to content that is less prominently viewed in order to encourage or discourage certain viewing behaviors.

Figure 4:
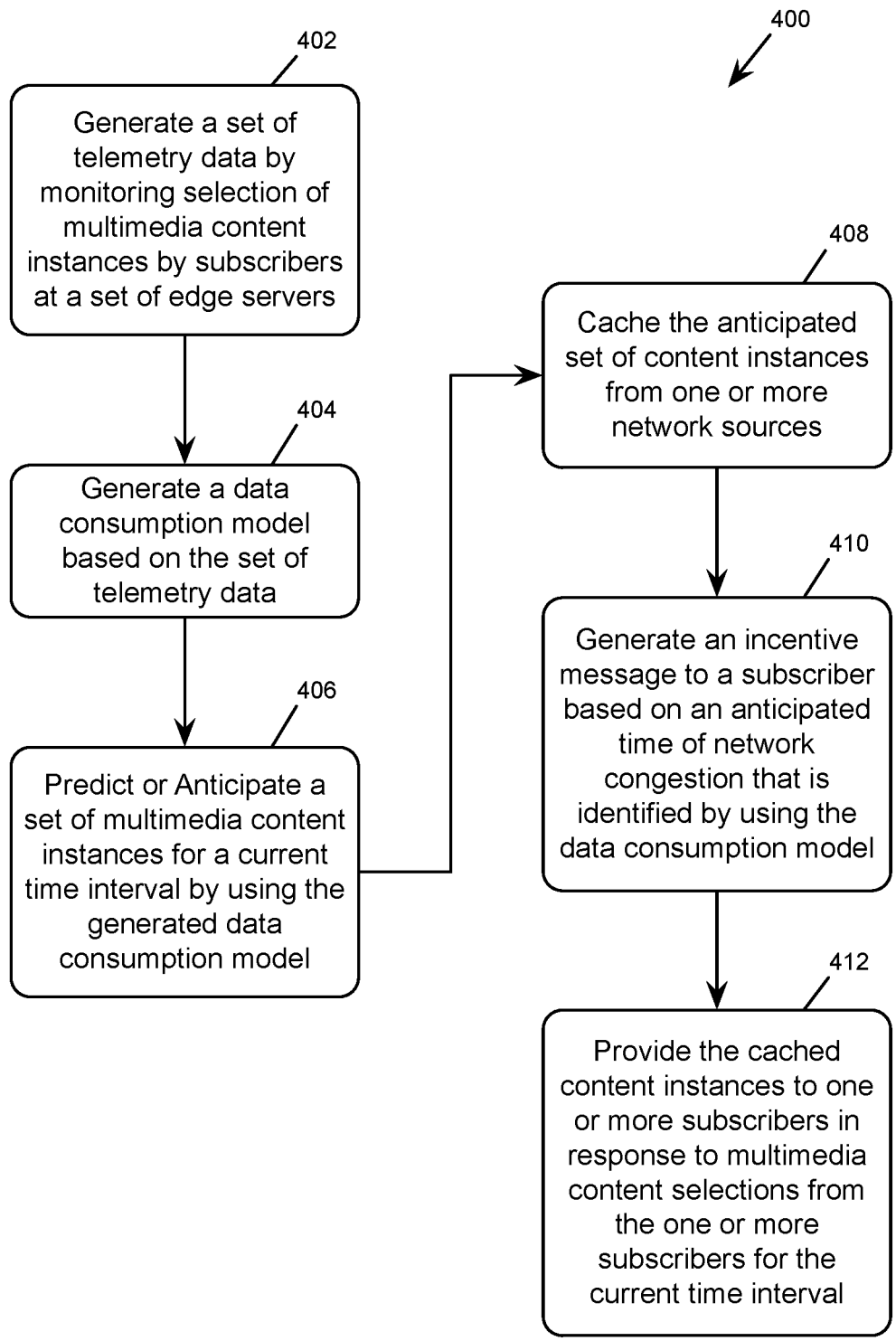
FIG. 4 conceptually illustrates a flow diagram of an example process performed by the content management system.

FIG. 4 conceptually illustrates a flow diagram of an example process 400 performed by the content management system. The content management system is operating in one or more computing devices that serve as edge servers of a subscriber network.

The process 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 402, the content management system generates a set of telemetry data by monitoring selections of multimedia content instances by subscribers of the subscriber network at a set of edge servers of the subscriber network. The set of telemetry data may include time of day or day of week for which a multimedia content instance is selected. In some embodiments, the system captures, from one or more subscriber devices within a geographic region, telemetry data associated with multimedia content access over a predetermined time interval.

At block 404, the system generates a data consumption model based on the set of telemetry data. The system analyzes the telemetry data to generate a data consumption model associated with instances of multimedia content being accessed by the one or more subscriber devices over the predetermined time interval. In some embodiments, the data consumption model is trained by using data points associated with quality parameters of the monitored selection of multimedia content instances. The quality parameters may include pixel density, viewing aspect ratio, and/or a bit-rate.

At block 406, the system anticipates or predicts a set of multimedia content instances for a current time interval by using the generated data consumption model. The anticipated set of media content instances is identified by using the data consumption model for the current time interval. In some embodiments, the system anticipates the set of multimedia content instances by using the data consumption model to infer a number of views for a particular multimedia content instance that are likely to occur during network congestion (e.g., when a network congestion measure is greater than a threshold).

At block 408, the system caches (fetch and store in a cache storage) the anticipated set of multimedia content instances from one or more network sources. The system generates a set of computer-executable instructions that are configured to retrieve the anticipated set of multimedia content from a content repository or network source but may cache only a subset of multimedia content on the set of edge servers. For example, for a selected multimedia content instance that is 120 minutes, the set of telemetry data may identify a first segment as being actually viewed (e.g., first 30 minutes), and the cached content instances includes a second segment that is identified based on the first segment (e.g., first 40 minutes). Doing so reduces cache storage and/or reduces network congestion since only a subset of the multimedia content is fetched and/or stored.

At block 410, the system generates an incentive message to a subscriber based on an anticipated time of network congestion that is identified by using the data consumption model, in order to avoid network congestion at the current time interval. In some embodiments, the system also suggests a quality parameter for viewing a selected multimedia content, the quality parameter being determined based on an anticipated level of network congestion that is identified by using the data consumption model for the current time interval.

At block 412, the system provides the cached content instances to one or more subscribers in response to multimedia content selections from the one or more subscribers for the current time interval.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
generating, by monitoring selections of multimedia content instances by subscribers of a subscriber network at a set of edge servers of the subscriber network, a set of telemetry data that includes quality parameters that reflect a quality of audio or video of the multimedia content instances;
generating a data consumption model based on the set of telemetry data;
anticipating a set of multimedia content instances for a current time interval by using the generated data consumption model;
determining a particular set of quality parameters based on an anticipated level of network congestion that is identified by using the generated data consumption model or based on a predominant preference of the subscribers as indicated by the set of telemetry data;
caching, from one or more network sources, a subset of the anticipated set of multimedia content instances that correspond to the particular set of quality parameters;
generating an incentive message to one or more subscribers for consuming the cached subset of the anticipated set of multimedia instances that correspond to the particular set of quality parameters; and
providing the cached subset of the anticipated set of multimedia content instances that correspond to the particular set of quality parameters and the incentive message to the one or more subscribers in response to multimedia content selections from the subscribers for the current time interval.

2. The computer-implemented method of claim 1, wherein the set of telemetry data comprises time of day or day of week for which a multimedia content instance is selected.

3. The computer-implemented method of claim 1, wherein the set of telemetry data identifies a first segment of a selected multimedia content instance that is actually viewed, wherein the cached subset of the anticipated set of multimedia content instances comprises a second segment of the selected multimedia content that is identified based on the first segment.

4. The computer-implemented method of claim 1, wherein anticipating the set of multimedia content comprises using the data consumption model to infer a number of views for a particular multimedia content instance that are likely to occur during a network congestion.

5. The computer-implemented method of claim 1, wherein the quality parameters include at least one of a pixel density, viewing aspect ratio, or a bit-rate.

6. The computer-implemented method of claim 1, comprising:
caching and suggesting a particular type of multimedia content based on status information received from subscriber user devices.

7. The computer-implemented method of claim 1, wherein the data consumption model is trained by using data points associated with quality parameters of the monitored selection of multimedia content instances.

8. A system comprising:
one or more processors;
memory coupled to the one or more processors, the memory including one or more modules that are executable by the one or more processors to:
generate, by monitoring selections of multimedia content instances by subscribers of a subscriber network at a set of edge servers of the subscriber network, a set of telemetry data that includes quality parameters that reflect a quality of audio or video of the multimedia content instances;
generate a data consumption model based on the set of telemetry data;
anticipate a set of multimedia content instances for a current time interval by using the generated data consumption model;
determine a particular set of quality parameters based on an anticipated level of network congestion that is identified by using the generated data consumption model or based on a predominant preference of the subscribers as indicated by the set of telemetry data;
cache, from one or more network sources, a subset of the anticipated set of multimedia content instances that correspond to the particular set of quality parameters;
generate an incentive message to one or more subscribers for consuming the cached subset of the anticipated set of multimedia instances that correspond to the particular set of quality parameters; and
provide the cached subset of the anticipated set of multimedia content instances that correspond to the particular set of quality parameters and the incentive message to the one or more subscribers in response to multimedia content selections from the subscribers for the current time interval.

9. The computing device of claim 8, wherein the set of telemetry data identifies a first segment of a selected multimedia content instance that is actually viewed, wherein the cached subset of the anticipated set of multimedia content instances comprises a second segment of the selected multimedia content that is identified based on the first segment.

10. The computing device of claim 8, wherein the actions further comprise caching and suggesting a particular type of multimedia content based on status information received from subscriber user devices.

11. The computing device of claim 10, wherein the status information include at least one of a wireless technology being used, frequency ranges available, signal strengths available, or bandwidth.

12. The computing device of claim 8, wherein the set of telemetry data comprises time of day or day of week for which a multimedia content instance is selected.

13. The computing device of claim 8, wherein anticipating the set of multimedia content comprises using the data consumption model to infer a number of views for a particular multimedia content instance that are likely to occur during a network congestion.

14. The computing device of claim 8, wherein the quality parameters include at least one of a pixel density, viewing aspect ratio, or a bit-rate.

15. The computing device of claim 8, wherein the data consumption model is trained by using data points associated with quality parameters of the monitored selection of multimedia content instances.

16. A system comprising:
one or more processors;
memory coupled to the one or more processors, the memory including one or more modules that are executable by the one or more processors to:
generate, by monitoring selections of multimedia content instances by subscribers of a subscriber network at a set of edge servers of the subscriber network, a set of telemetry data that includes quality parameters that reflect a quality of audio or video of the multimedia content instances;
generate a data consumption model based on the set of telemetry data;
anticipate a set of multimedia content instances for a current time interval by using the generated data consumption model;
determining a particular set of quality parameters based on an anticipated level of network congestion that is identified by using the generated data consumption model or based on a predominant preference of the subscribers as indicated by the set of telemetry data;
cache, from one or more network sources, a subset of the anticipated set of multimedia content instances that correspond to the particular set of quality parameters;
generate an incentive message to one or more subscribers for consuming the cached subset of the anticipated set of multimedia instances that correspond to the particular set of quality parameters; and
provide the cached subset of the anticipated set of multimedia content instances that correspond to the particular set of quality parameters and the incentive message to the one or more subscribers in response to multimedia content selections from the subscribers for the current time interval.

17. The system of claim 16, wherein the set of telemetry data identifies a first segment of a selected multimedia content instance that is actually viewed, wherein the cached subset of the anticipated set of multimedia content instances comprises a second segment of the selected multimedia content that is identified based on the first segment.

18. The system of claim 16, wherein the data consumption model is trained by using data points associated with quality parameters of the monitored selection of multimedia content instances.

19. The system of claim 16, wherein the set of telemetry data comprises time of day or day of week for which a multimedia content instance is selected.

20. The system of claim 16, wherein the set of telemetry data identifies a first segment of a selected multimedia content instance that is actually viewed, wherein the cached subset of the anticipated set of multimedia content instances comprises a second segment of the selected multimedia content that is identified based on the first segment.

* * * * *